(12) United States Patent
Ko et al.

(10) Patent No.: US 9,805,118 B2
(45) Date of Patent: Oct. 31, 2017

(54) TRANSCRIPTION METHOD, APPARATUS AND COMPUTER PROGRAM PRODUCT

(75) Inventors: Tak M. Ko, Vancouver (CA); Dragan Zigic, Burnaby (CA)

(73) Assignee: Change Healthcare LLC, Alpharetta, GA (US)

( * ) Notice: Subject to any disclaimer, the term of this patent is extended or adjusted under 35 U.S.C. 154(b) by 659 days.

(21) Appl. No.: 13/538,671

(22) Filed: Jun. 29, 2012

(65) Prior Publication Data

US 2014/0006020 A1  Jan. 2, 2014

(51) Int. Cl.
*G10L 15/00* (2013.01)
*G06F 17/30* (2006.01)
*G10L 15/26* (2006.01)

(52) U.S. Cl.
CPC ........ *G06F 17/30778* (2013.01); *G10L 15/26* (2013.01)

(58) Field of Classification Search
CPC ....... G10L 15/26; G10L 15/265; G06F 17/24; G06F 17/30778; G06F 17/30126; G06F 3/016; G06F 3/0202; G06F 3/0338; G06F 3/0483; G06F 17/30873; G06F 17/3089; G06F 2216/15; G06F 3/0482; G06F 3/04842; G06F 3/0485; G06F 9/4445; G02B 27/01; G06Q 30/0241; D06F 39/005

See application file for complete search history.

(56) References Cited

U.S. PATENT DOCUMENTS

| | | | |
|---|---|---|---|
| 6,345,253 B1* | 2/2002 | Viswanathan | 704/272 |
| 7,231,351 B1* | 6/2007 | Griggs | 704/251 |
| 7,444,285 B2* | 10/2008 | Forbes | 704/235 |
| 7,836,412 B1* | 11/2010 | Zimmerman | 715/827 |
| 8,117,034 B2 | 2/2012 | Gschwendtner | |
| 9,639,623 B2* | 5/2017 | Lund | G06F 17/3089 |
| 2007/0011012 A1* | 1/2007 | Yurick | G10L 15/26 704/277 |
| 2008/0122796 A1* | 5/2008 | Jobs | G06F 3/0488 345/173 |

(Continued)

OTHER PUBLICATIONS

Longest Common Seqeuence Problem—Wikipedia, the free encyclopedia [online] [retrieved Apr. 15, 2016]. Retrieved from the Internet: https://en.wikipedia.org/wiki/Longest_common_subsequence_problem>. (dated Feb. 18, 2016) 12 pages.

*Primary Examiner* — Abdelali Serrou
(74) *Attorney, Agent, or Firm* — Alston & Bird LLP (57) ABSTRACT

A transcription method, apparatus and computer program product are provided to permit a transcripted text report to be efficiently reviewed. In the context of a method, an audio file and a transcripted text report corresponding to the audio file may be received. For each of a plurality of positions within the transcripted text report, the method correlates the respective position within the transcripted text report with a corresponding position within the audio file. The method also augments the transcripted text report to include a plurality of selectable elements. Each selectable element is associated with a respective position within the transcripted text report. The selectable elements are responsive to user actuation in order to cause the audio file to move to the corresponding position. A corresponding apparatus and computer program product are also provided.

18 Claims, 5 Drawing Sheets

Single click toggles play/pause
Double click plays from the position
When playing use mouse wheel for volume control

— 30

Yes We Can

— 30a

I want to congratulate Senator Clinton on a hard-fought victory here in New Hampshire A few weeks ago, no one imagined that we'd have accomplished what we did here tonight.

For most of this campaign, we were far behind, and we always knew our climb would be steep.

But in record numbers, you came out and spoke up for change. And with your voices and your votes, — 30b you made it clear that at this moment – in this election – there is something happening in America.

(56) References Cited

U.S. PATENT DOCUMENTS

| | | | | |
|---|---|---|---|---|
| 2008/0165153 | A1* | 7/2008 | Platzer | G06F 1/1626 345/173 |
| 2008/0168349 | A1* | 7/2008 | Lamiraux | G06F 3/0482 715/702 |
| 2008/0220752 | A1* | 9/2008 | Forstall | H04M 1/56 455/415 |
| 2008/0320391 | A1* | 12/2008 | Lemay | G06F 3/04886 715/702 |
| 2009/0007017 | A1* | 1/2009 | Anzures | G06F 3/04883 715/835 |
| 2009/0021482 | A1* | 1/2009 | Lee | G06F 1/1616 345/163 |
| 2009/0112467 | A1* | 4/2009 | Jiang et al. | 701/211 |
| 2009/0307615 | A1* | 12/2009 | Jalon | G06F 3/0483 715/763 |
| 2010/0100470 | A1* | 4/2010 | Buchanan | G06Q 10/10 705/35 |
| 2010/0325043 | A1* | 12/2010 | Buchanan | G06Q 20/105 705/41 |
| 2011/0087985 | A1* | 4/2011 | Buchanan | G06F 3/04847 715/771 |
| 2011/0107265 | A1* | 5/2011 | Buchanan | G06Q 30/02 715/835 |
| 2011/0125847 | A1* | 5/2011 | Cocheu et al. | 709/204 |
| 2011/0167350 | A1* | 7/2011 | Hoellwarth | 715/727 |
| 2011/0239107 | A1* | 9/2011 | Phillips et al. | 715/234 |
| 2012/0200774 | A1* | 8/2012 | Ehlers, Sr. | H04N 21/4104 348/515 |
| 2012/0290974 | A1* | 11/2012 | Doig et al. | 715/808 |
| 2012/0297429 | A1* | 11/2012 | Reed | G06F 17/30899 725/86 |
| 2013/0058471 | A1* | 3/2013 | Garcia | 379/202.01 |
| 2013/0290902 | A1* | 10/2013 | Martin | D06F 9/005 715/823 |
| 2014/0327677 | A1* | 11/2014 | Walker | G06T 11/206 345/440 |

* cited by examiner

Single click toggles play/pause
Double click plays from the position
When playing use mouse wheel for volume control

Yes We Can

I want to congratulate Senator Clinton on a hard-fought victory here in New Hampshire.

A few weeks ago, no one imagined that we'd have accomplished what we did here tonight.

For most of this campaign, we were far behind, and we always knew our climb would be steep.

But in record numbers, you came out and spoke up for change. And with your voices and your votes, you made it clear that at this moment – in this election – there is something happening in America.

FIG. 4

FIG. 5 ns of the transcripted text report and the audio file in such a manner that corresponding portions of the transcripted text report and the audio file may be readily identified, thereby facilitating the playback of the a selected portion of the audio file during the review of the transcripted text report. Thus, a transcripted text report may be reviewed for accuracy relative to a corresponding audio file in a quicker and more efficient manner.

TRANSCRIPTION METHOD, APPARATUS AND COMPUTER PROGRAM PRODUCT

TECHNOLOGICAL FIELD

Embodiments of the present invention relate generally to the transcription of an audio file and, more particularly, to the augmentation of a transcripted text report of an audio file to facilitate, for example, subsequent review of the transcripted text report in light of the associated audio file.

BACKGROUND

It is common in a number of scenarios to dictate a report or the like which is captured in an audio file. An audio file is oftentimes transcribed in order to create a transcripted text report. The transcripted text report may then be saved as a written record and may be referenced by others in order to review the report.

By way of example, a radiologist may review an image of a patient, such as an x-ray or other image, and may dictate a report relating to the image including the radiologist's findings with respect to the image. Following dictation of the report, the report may be typed by a transcriptionist to create the corresponding transcripted text report. A healthcare practitioner, such as the same or another radiologist, will then review the transcripted text report to determine if the transcripted text report is accurate. In an instance in which the radiologist who reviews the transcripted text report determines that the transcripted text report is accurate, the reviewing radiologist may sign off or otherwise verify the transcripted text report. Alternatively, in an instance in which the transcripted text report contains an inaccuracy, the inaccuracy may be flagged or otherwise identified for correction. By reviewing the transcripted text report and verifying the accuracy of the transcripted text report, it is ensured that the transcriptionist has correctly transcribed the audio file including, most importantly, the radiologist's findings or other final impressions of the image.

In order to review the accuracy of the transcripted text report, the reviewing radiologist may listen to the entire audio file. The reviewing radiologist may then wish to listen again to selected portions of the audio file, such as the portions of the audio file that present the findings or other final impressions. In order to reposition the audio file in order to listen to the selected portions of the audio file, the reviewing radiologist may need to fast forward or rewind the audio file and may therefore be required to estimate the proper position within the audio file at which the selected portion of the audio file is located. This process of reviewing the audio file in conjunction with the determination of the accuracy of a transcripted text report may sometimes be inefficient and time consuming since the reviewing radiologist may be required to repeatedly guess as to the portion of the audio file to be reviewed with the radiologist's guesses not always proving to be correct. Such inefficiencies may be particularly challenging for healthcare practitioner, such as radiologist, who already has a demanding schedule.

BRIEF SUMMARY

A transcription method, apparatus and computer program product are provided according to embodiments of the present invention in order to permit a transcripted text report to be reviewed in a more efficient manner. In this regard, the transcription method, apparatus and computer program product of an example embodiment may correlate portions of the transcripted text report and the audio file in such a manner that corresponding portions of the transcripted text report and the audio file may be readily identified, thereby facilitating the playback of the a selected portion of the audio file during the review of the transcripted text report. Thus, a transcripted text report may be reviewed for accuracy relative to a corresponding audio file in a quicker and more efficient manner.

In one embodiment, a method is provided that includes receiving an audio file and a transcripted text report corresponding to the audio file. For each of a plurality of positions within the transcripted text report, the method of this embodiment correlates, with processing circuitry, the respective position within the transcripted text report with a corresponding position within the audio file. Although various positions within the transcripted text report may be identified, at least some of the plurality of positions within the transcripted text report may be associated with a punctuation mark or the commencement of a paragraph. The method of this embodiment also augments the transcripted text report to include a plurality of selectable elements. Each selectable element is associated with a respective position within the transcripted text report. The selectable elements are responsive to user actuation in order to cause the audio file to move to the corresponding position.

The plurality of selectable elements may include a plurality of icons. In this embodiment, the augmentation of the transcripted text report may include the insertion of an icon within the transcripted text report at each of the plurality of positions of the transcripted text report. The icons may be responsive to user actuation in order to cause the audio file to move to the corresponding position. The icons of one embodiment are also responsive to user actuation in order to cause the audio file to be played beginning at a corresponding position. Alternatively, in an instance in which the audio file is already being played, the icons of one embodiment are also responsive to user actuation in order to cause the playing of the audio file to be paused.

The correlation of the respective position within the transcripted text report with a corresponding position within the audio file may include utilizing voice recognition to analyze the audio files so as to identify words and comparing the words that are identified from the audio file with words of the transcripted text report to identify a correspondence there between. In this regard, the comparison of the words that are identified from the audio file with words of the transcripted report may include the comparison of a collection of words that are identified from the audio file with a sentence from the transcripted text report to identify a correspondence therebetween.

In another embodiment, a transcription apparatus is provided that includes processing circuitry configured to receive an audio file and a transcripted text report corresponding to the audio file. For each of a plurality of positions within the transcripted text report, the processing circuitry is configured to correlate the respective position within the transcripted text report with a corresponding position within the audio file. Although the plurality of positions within the transcripted text report may be determined in various manners, at least some of the plurality of positions within the transcripted text report may be associated with a punctuation mark or the commencement of a paragraph. The processing circuitry of this embodiment is also configured to augment the transcripted text report to include a plurality of selectable elements. Each selectable element is associated with a respective position within the transcripted text report. The selectable elements are responsive to user actuation in order to cause the audio file to move to the corresponding position.

The plurality of selectable elements of one embodiment includes a plurality of icons. In this embodiment, the processing circuitry is configured to augment the transcripted text report by inserting an icon within the transcripted text report at each of the plurality of positions of the transcripted text report. The icons of this embodiment are responsive to user actuation in order to cause the audio file to move to the corresponding position. The icons may also be responsive to user actuation in order to cause the audio file to be played beginning at the corresponding position. In an instance in which the audio file is already being played, the icons may alternatively be responsive to user actuation in order to cause playing of the audio file to be paused.

The processing circuitry of one embodiment is configured to correlate the respective position within the transcripted text report with a corresponding position within the audio file by utilizing voice recognition to analyze the audio file so as to identify words and then to comparing the words that are identified from the audio file with words of the transcripted text report to identify a correspondence therebetween. The processing circuitry may be configured to compare the words that are identified from the audio file with words from the transcripted text report by comparing a collection of words that are identified from the audio file with a sentence from the transcripted text report to identify a correspondence therebetween.

In a further embodiment, a computer program product is provided that includes at least one non-transitory computer-readable storage medium having computer-executable program code instructions stored therein. The computer-executable program code instructions include program instructions configured to receive an audio file and a transcripted text report corresponding to the audio file. For each of a plurality of positions within the transcripted text report, the program code instructions of this embodiment are configured to correlate the respective position within the transcripted text report with a corresponding position within the audio file. While a plurality of positions may be determined in various manners, at least some of the plurality of positions within the transcripted text report may be associated with a punctuation mark or commencement of a paragraph. The computer-executable program code instructions of this embodiment also include program code instructions configured to augment the transcripted text report to include a plurality of selectable elements. Each selectable element is associated with the respective position within the transcripted text report. The selectable elements are responsive to user actuation in order to cause the audio file to move to the corresponding position.

The plurality of selectable elements of one embodiment includes a plurality of icons. In this embodiment, the program code instructions configured to augment the transcripted text report include program code instructions configured to insert an icon within the transcripted text report at each of a plurality of positions of the transcripted text report. The icons may be responsive to user actuation in order to cause the audio file to move to the corresponding position. The icons may also be responsive to user actuation in order to cause the audio file to be played beginning at the corresponding position or to cause playing of the audio file to be paused.

The program code instructions configured to correlate the respective position within the transcripted text report with a corresponding position within the audio file may, in one embodiment, include program code instructions configured to utilize voice recognition to analyze the audio file to identify words and program code instructions configured to compare the words that are identified from the audio file with words of the transcripted text report to identify correspondence therebetween. The program code instructions that are configured to compare the words that are identified from the audio file with words of a transcripted text report include, in one embodiment, program code instructions configured to compare a collection of words that are identified from the audio file with a sentence from the transcripted text report to identify correspondence therebetween.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A transcription method, apparatus and compute program product are provided in accordance with example embodiments of the present invention in order to correlate an audio file and a transcripted text report of the audio file. Thus, the transcription method, apparatus and computer program product of an example embodiment may facilitate the review and verification of the transcripted text report by reference to the corresponding audio file. In this regard, the transcripted text report may be reviewed and verified in a more efficient and a quicker manner since those portions of the audio file that correspond to portions of interest within the transcripted text report may be readily identified and reviewed. While the transcription method, apparatus and computer program product may be utilized in conjunction with any type of audio file and any type of transcripted text report, the transcription method, apparatus and computer program product of an example embodiment will be described hereinafter for purposes of example, but not of limitation, in conjunction with the review of an audio file created by a radiologist, such as during or following the review of an image by a radiologist, in order to generate a report that includes the radiologist's findings with respect to the image and that has been verified relative to the audio file.

In this regard, an audio file may be initially created, such as by dictating to a digital voice recorder or other type of dictation device. The audio file may relate to various subjects including, for example, the reports generated by health care professionals. For example, a radiologist may review an image of a patient and may dictate a report relating to the review of the image, including their findings with respect to the image. The image may be acquired by a number of different imaging modalities including, for example, ultrasound (US), magnetic resonance (MR), positron emission tomography (PET), computed tomography (CT), mammography (MG), digital radiology (DR), computed radiology (CR) or the like.

The audio file may then be transcribed, such as by a transcriptionist, to create a transcripted text file. In some instances, the transcripted text file is reviewed and verified relative to the corresponding audio file. In this regard, a transcripted text report corresponding to an audio file that represents the report of a health care practitioner, such as report of a radiologist following the review of an image, may be performed to verify that the transcripted text file is an accurate reproduction of the audio file. In this regard, a radiologist, such as a radiologist who initially dictated the audio file or another radiologist, may review the transcripted text file to verify its accuracy, including listening to all or at least portions of the audio file in order to make such a determination.

In order to improve the efficiency with which the transcripted text may be reviewed in relation to the corresponding audio file, the method of one embodiment may receive an audio file and a transcripted text report corresponding to the audio file, that is, the transcripted text report that represents a transcription of the audio file. See block 10 of FIG. 1. In this regard, the operations represented by the flow chart of FIG. 1 may be performed by a transcription apparatus 20 that is specifically configured in accordance with embodiments of the present invention. A transcription apparatus may be embodied in any of a variety of computing devices, such as laptop computers, tablet computers, smartphones, desktop computers, computer workstations or the like. In some example embodiments, the transcription apparatus includes various means for performing the various functions described herein. These means may include, for example, one or more of processing circuitry 22, a memory 24, and/or a user interface 26 for performing the various functions herein described. The means of the apparatus as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory) that is executable by a suitably configured processing device (e.g., the processing device), or some combination thereof.

The processing circuitry 22 may, for example, be embodied as various means including one or more microprocessors, one or more coprocessors, one or more multi-core processors, one or more controllers, one or more computers, various other processing elements including integrated circuits such as, for example, an ASIC (application specific integrated circuit) or FPGA (field programmable gate array), or some combination thereof. The processing circuitry may be embodied on a single computing device or may be distributed across a plurality of computing devices collectively configured to function as the apparatus. In some example embodiments, the processing circuitry is configured to execute instructions stored in the memory 24 or otherwise accessible to the processing circuitry. These instructions, when executed by the processing circuitry, may cause the transcription apparatus 20 to perform one or more of the functionalities of the apparatus as described herein. As such, whether configured by hardware or software methods, or by a combination thereof, the processing circuitry may comprise an entity capable of performing operations according to embodiments of the present invention while configured accordingly. Thus, for example, when the processing circuitry is embodied as an ASIC, FPGA or the like, the processing circuitry may comprise specifically configured hardware for conducting one or more operations described herein. Alternatively, as another example, when the processing circuitry is embodied as an executor of instructions, such as may be stored in the memory, the instructions may specifically configure the processing circuitry to perform one or more algorithms and operations described herein.

The memory 24 may include, for example, volatile and/or non-volatile memory. Although illustrated in FIG. 2 as a single memory, the memory may comprise a plurality of memories. The plurality of memories may be embodied on a single computing device or distributed across a plurality of computing devices. The memory may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory may comprise any non-transitory computer readable storage medium. The memory may be configured to store information, data, applications, instructions, or the like for enabling the transcription apparatus 20 to carry out various functions in accordance with example embodiments of the present invention. For example, in some example embodiments, the memory is configured to buffer input data for processing by the processing circuitry 22. Additionally or alternatively, in some example embodiments, the memory is configured to store program instructions for execution by the processing circuitry.

The user interface 26 may be in communication with the processing circuitry 22 to receive an indication of a user input and/or to provide an audible, visual, mechanical, or other output to a user. In one embodiment, the user interface may include, for example, a keyboard and/or a touch sensitive input device, such as a touch sensitive mouse, for receiving user input. The user interface may also include a display for presenting medical images for review and manipulation by a user. The user interface may be in communication with the memory 24, such as via a bus. Although not shown in FIG. 2, the transcription apparatus 20 of one embodiment may also include a communication interface, such as one or more antennas, one or more transceivers, etc., for facilitating communication between the transcription apparatus and one or more other computing or communications devices.

Returning now to FIG. 1 and with reference to the transcription apparatus 20 of the embodiment of FIG. 2, the transcription apparatus may include means, such as the processing circuitry 22, the communication interface or the like, for receiving the audio file and the transcripted text report that corresponds to the audio file. In this regard, the audio file and the transcripted text report may be stored in memory 24 and accessed by the processing circuitry. Alternatively, the transcription apparatus may include a communication interface for receiving the audio file and/or the transcription text report, such as via a wireless connection or a wireline connection.

Figure 1:
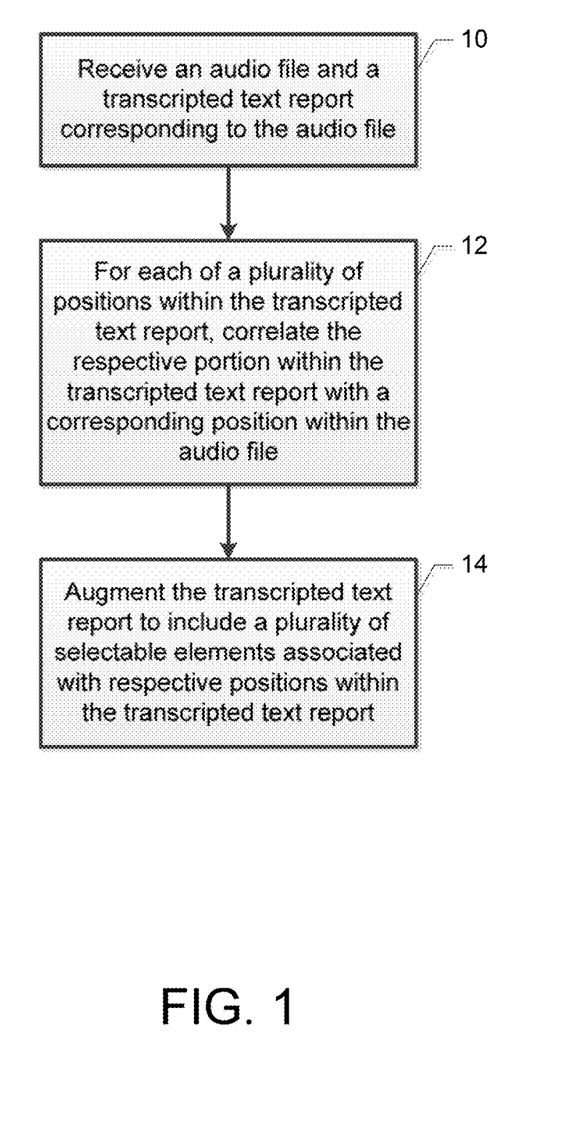
FIG. 1 is a flow chart illustrating the operations performed by a transcription apparatus configured in accordance with an example embodiment of the present invention.
Figure 2:
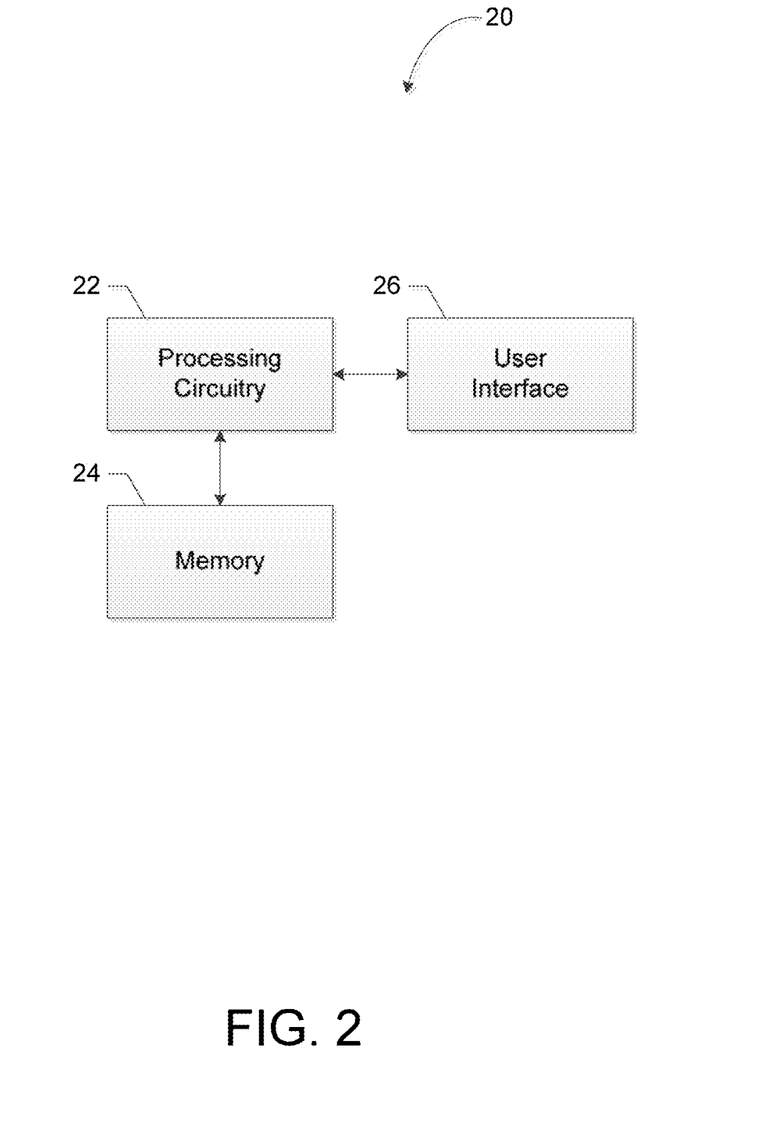
FIG. 2 is a block diagram of an transcription apparatus that may be specifically configured in accordance with an example embodiment of the present invention.

As shown in block 12 of FIG. 1, the transcription apparatus 20 may include means, such as the processing circuitry 22 or the like, for correlating, for each of a plurality of positions within the transcripted text report, a respective position within the transcripted text report with a corresponding position within the audio file. For example, each word of the transcripted text report may be correlated with a corresponding position within the audio file, each sentence within the transcripted text report may be associated with a corresponding position within the audio file, and/or each paragraph within the transcripted text report may be correlated with a corresponding position within the audio file. Indeed, while the correlation between a respective position within the transcripted text report and a corresponding position within the audio file may be performed on a word basis, a sentence basis or a paragraph basis, as noted above, the various positions within the transcripted text report that are correlated with corresponding positions within the audio file may be identified in other manners, such as by correlating each punctuation mark within the transcripted text report with a corresponding position within the audio file.

The correlation between a respective position within the transcripted text report and a corresponding position within the audio file may be performed by the processing circuitry 22 in various manners. In one embodiment that is described below for purposes of illustration, but not of limitation, the processing circuitry utilizes voice recognition to analyze the audio file so as to identify words. In this regard, the processing circuitry may implement a voice recognition engine that is configured to recognize and to identify the pronunciation of a plurality of words and, in one embodiment, that may be trained so as to recognize the pronunciation of a plurality of words, such as a plurality of the most frequently used words, by a particular user, such as a radiologist.

In one embodiment, the processing circuitry 22 and, more particularly, the voice recognition engine may identify each unique word that is included within the audio file. For example, if the audio file includes a following sentence, "I am working on it, and I am close." The processing circuitry, such as a voice recognition engine of the processing circuitry, may identify "I", "am", "working", "on", "it" and "close" as the unique words that are included within the audio file. The processing circuitry and, more particularly, the voice recognition engine implemented by the processing circuitry, also identifies the position of each word within the audio file. In this regard, the position of a word within the audio file will be hereinafter referenced as the audio position of the word. While the position within the audio file may be identified in various manners, the processing circuitry and, more particularly, the voice recognition engine of one embodiment may identify the audio position of each word based upon the elapsed time from the beginning of the audio file to the word as the audio position of the word in one embodiment.

In the foregoing example in which the word begins "I" appears on two occasions, the processing circuitry 22 and, more particularly, the voice recognition engine implemented by the processing circuitry, may identify both audio positions of the word "I", such as at one millisecond and five milliseconds relative to the beginning of the audio file. As such, in an instance in which a word appears a plurality of times within an audio file, the processing circuitry, such as a voice recognition engine implemented by the processing circuitry, may identify the position of each occurrence of the word within the audio file. Although the position of a respective word that appears multiple times may be represented as a compact form, such as ["I" 1 ms, 5 ms], the compact representation may be expanded such that each occurrence of the same word is individually associated with a corresponding position within the audio file, such as ["I" 1 ms] and ["I" 5 ms]. In this regard, the association of a word and its corresponding audio location may be referred to as a word and audio location pair, with a plurality of word and audio location pairs, such as all of the word and audio location pairs that appear within the audio file, being referred to as a collection. Based upon the respective audio locations, the collection of word and audio location pairs may be placed in an order of occurrence.

In one embodiment, the processing circuitry 22, such as the voice recognition engine implemented by the processing circuitry, may compare subsequences from the collection of word and audio location pairs that have been identified from the audio file with sentences from the transcripted text report on a sentence-by-sentence basis in order to determine a correspondence therebetween. For each sentence of the transcripted text report, the processing circuitry, such as the voice recognition engine implemented by the processing circuitry of one embodiment, may identify the longest subsequence within the collection of words and audio location pairs that matches the respective sentence of the transcripted text report and may identify the resulting subsequence of word and audio location pairs to correspond to the respective sentence.

The transcription apparatus 20 and, more particularly, the processing circuitry 22, the memory 24 or the like may also augment the transcripted text report to include a plurality of selectable elements. See block 14 of FIG. 1. In this regard, each selectable element is associated with a respective position within the transcripted text report. Although selectable elements may be associated with positions within a transcripted text report that are defined in various manners, the processing circuitry of one embodiment may be configured to associate a selectable element with the beginning of each paragraph and/or with each punctuation mark within the transcripted text report. In addition to being associated with a respective position within the transcripted text report, the selectable element or at least the respective position within the transcripted text report with which the selectable element is associated may also be associated with a corresponding position within the audio file based upon the correlation of the respective position within the transcripted text report and the corresponding position within the audio file. Thus, each selectable element that is associated with the beginning of a paragraph from the transcripted text report may also be associated with the corresponding position within the audio file that is correlated to the beginning of the respective paragraph. Further, each selectable element that is associated with a punctuation mark within the transcripted text report may also be associated with the corresponding position within the audio file that is correlated to the respective punctuation mark. As such, a user who is reviewing the transcripted text report, following its augmentation, may actuate a selectable element in order to cause the audio file to move to the corresponding position, that is, to move to the position within the audio file that has been correlated with the position within the transcripted text report with which the selectable element is associated.

Figure 3:
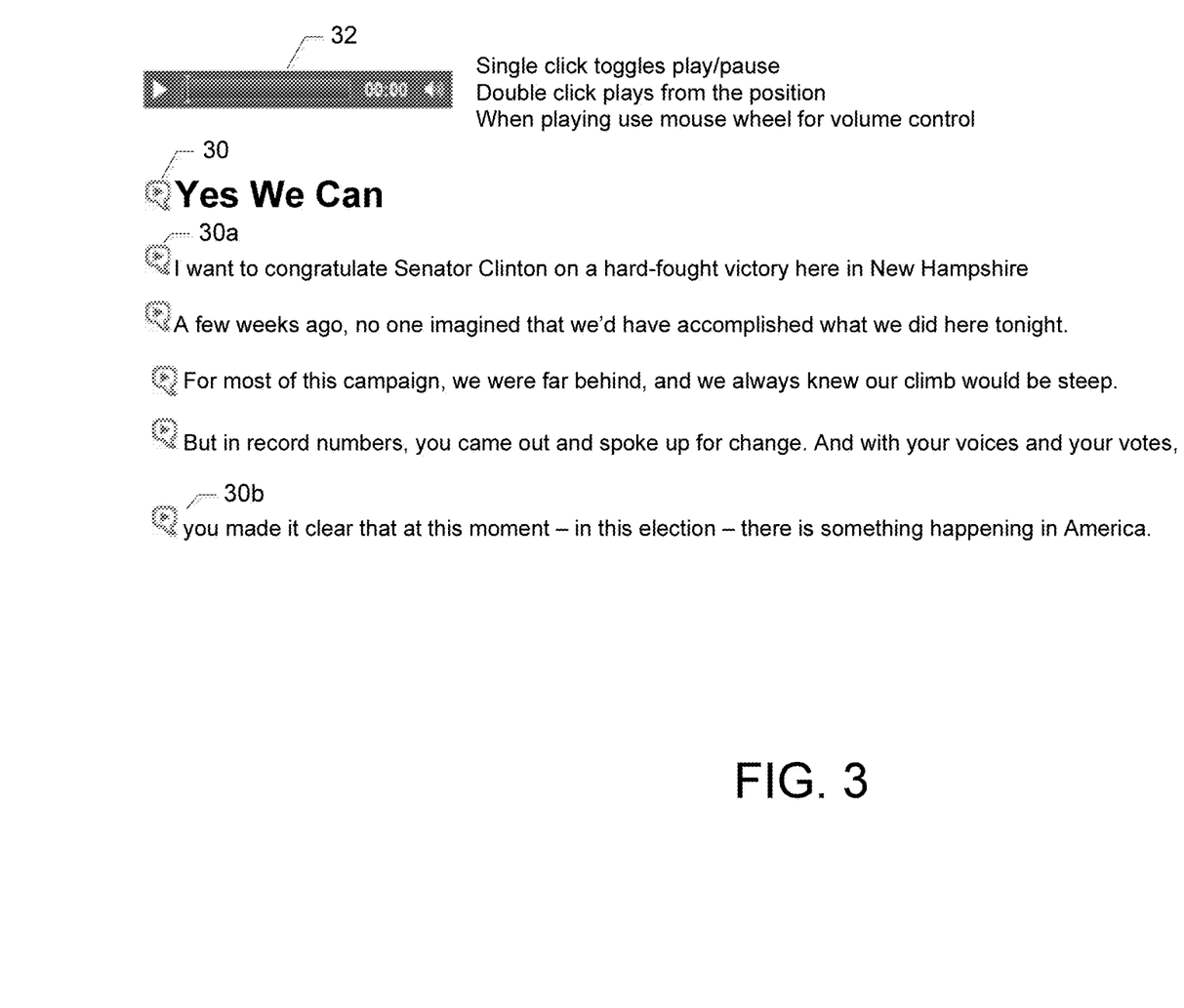
FIG. 3 is an example of a transcripted text report following augmentation in accordance with an example embodiment of the present invention.

Various types of selectable elements may be utilized in order to augment a transcripted text report. For example, the first word of a paragraph may serve as the selectable element associated with the beginning of the paragraph, while the punctuation mark may serve as the selectable element associated with itself. In one embodiment, however, a transcripted text report may be augmented with a plurality of icons that serve as the selectable elements. In this embodiment, the transcripted text report may be augmented by inserting an icon within the transcripted text report at each of the plurality of positions of the transcripted text report that are to be associated with selectable elements. By way of example, FIG. 3 illustrates an initial portion of a speech by President Obama that is entitled "Yes We Can". As shown, an icon has been associated with the beginning of each paragraph as well as with each punctuation mark. By selecting any one of the icons, such as by double clicking upon a respective icon, the transcription method and apparatus of one embodiment will cause the audio file to be moved to the corresponding position that has been correlated with the position within the transcripted text report that is associated with the icon that has been selected. Thus, selection of the icon designated 30a in FIG. 3, will cause the audio file to move to a position designated 1:22 as shown by the time scroll bar 32 of FIG. 4. Alternatively, selection of the icon designated 30b in FIG. 3 will cause the audio file to move to the position designated 1:54 as shown by the time scroll bar 32 of in FIG. 5. Thus, the inclusion of icons or other selectable elements within the transcripted text report permits a user to quickly and accurately move to different portions of the audio file in order to listen to the portion of the audio file that corresponds to the portion of the transcripted text report associated with the icon that has been selected.

Figure 4:
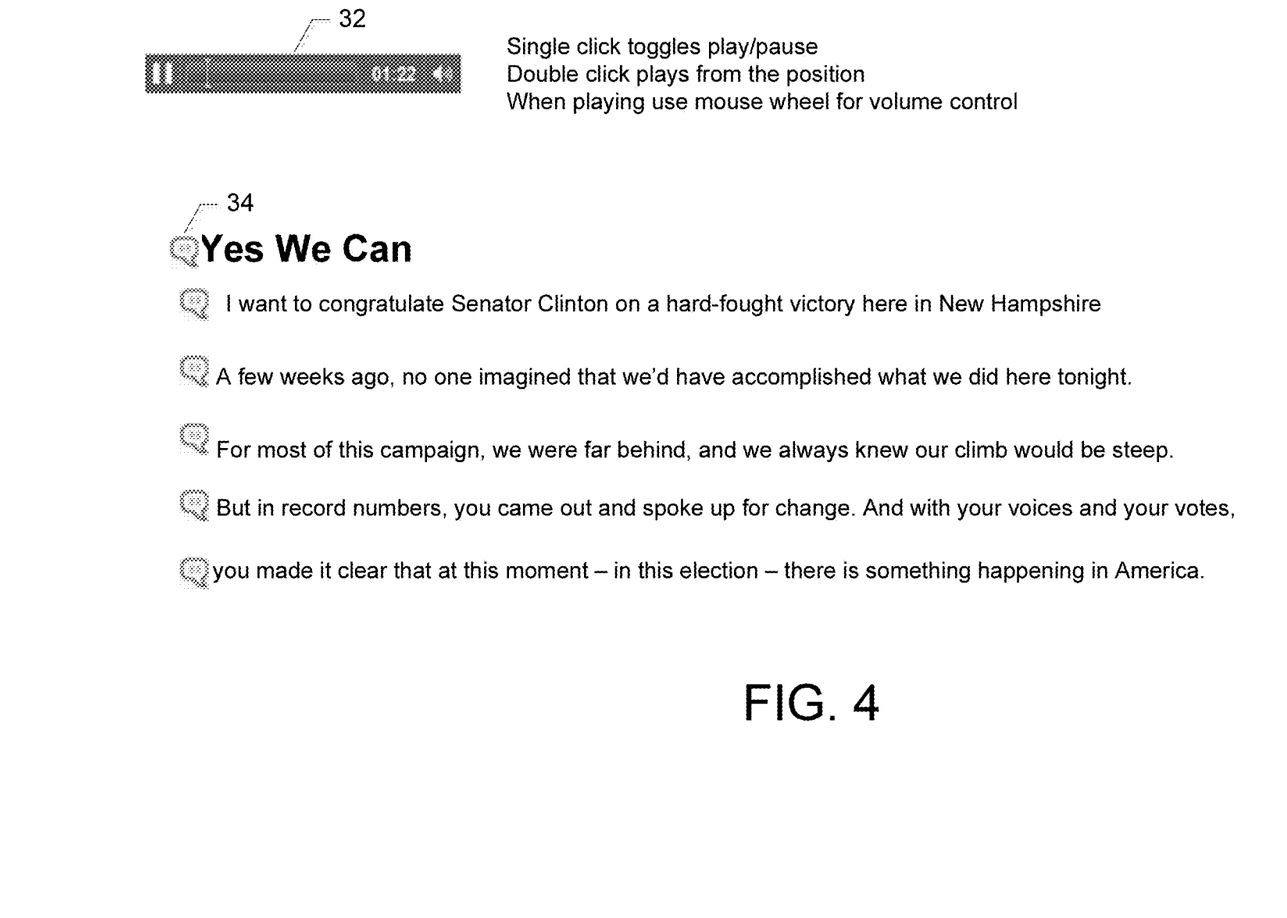
FIG. 4 is an example of the transcripted text report of FIG. 3 following augmentation in accordance with an example embodiment of the present invention and following selection of an icon within the transcripted text report.
Figure 5:
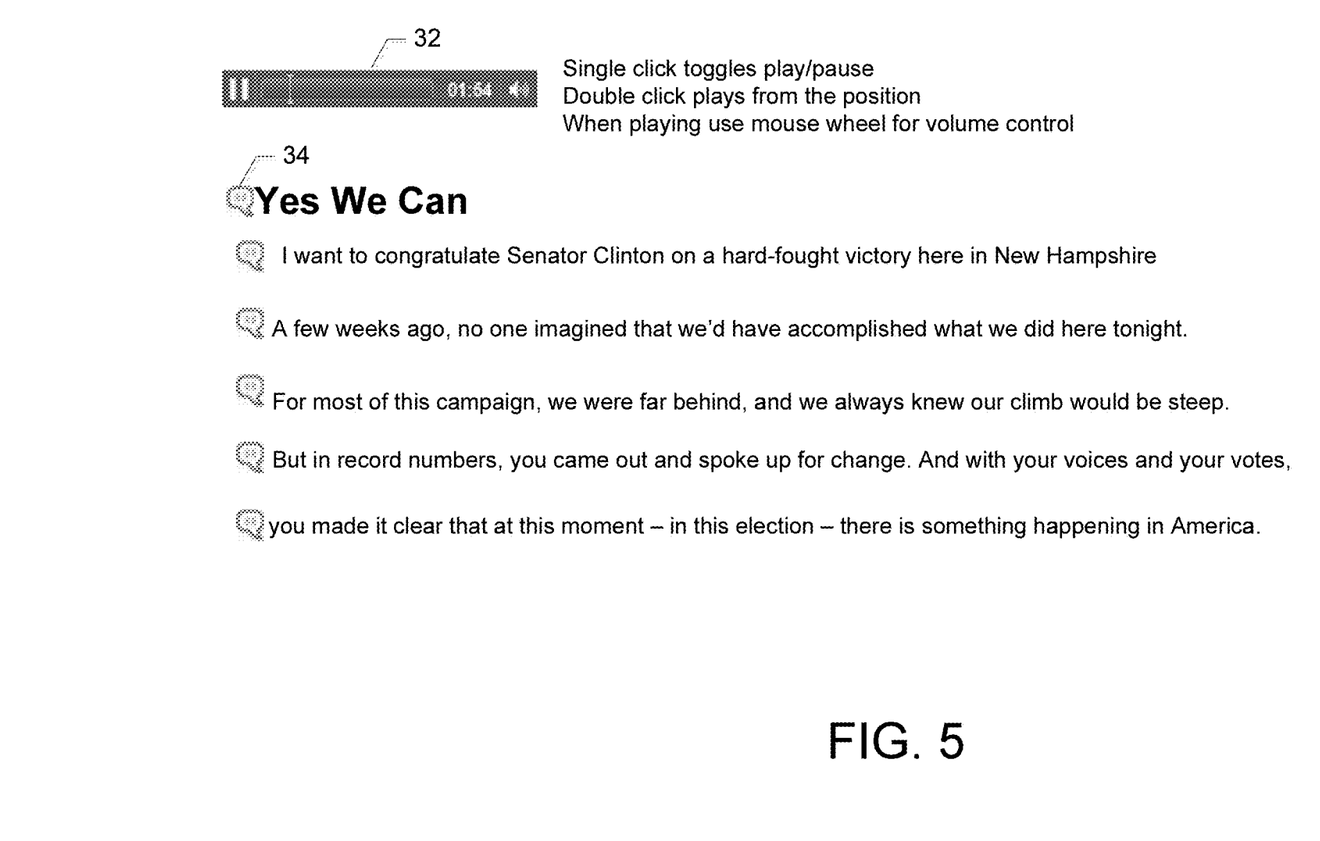
FIG. 5 is an example of the transcripted text report of FIG. 3 following augmentation in accordance with an example embodiment of the present invention and following selection of another icon within the transcripted text report.

In an instance in which the audio file is not currently being played, the selection of an icon, such as an icon as shown in FIG. 3, not only causes the audio file to move to the position associated with the selected icon, but also to commence playing of the audio file at the selected position. In order to cause the audio file to stop playing, the user may then click any of the icons as shown in FIGS. 4 and 5. As such, the icons may include a representation of the function, e.g., play, pause, etc., associated with the icon. In this regard, in an instance in which the audio file is not being played, the icons 30 may include a representation of a "play" button as shown in FIG. 3 so as to provide a visual indication to the user regarding the associated function that is initiated upon selection of the icon. However, once the audio file begins to play, the representation of the icons 34 may be changed as shown in FIGS. 4 and 5 to include a representation of a "pause" button so as to provide a visual indication to the user regarding the function that would be initiated upon actuation of the icon. As such, the selection of an icon in an instance in which the audio file is being played and the selection of an icon at the same position within the transcripted text report in an instance in which the audio file is not being played may initiate different functions, such as with the function brought about by actuation of the icon alternately toggling between playing of the selected portion of the audio file in an instance in which the audio file is not currently being played and ceasing further playing of the audio file in an instance in which the audio file is currently being played. In one embodiment, in an instance in which the audio file is being played, the icons 34 may also serve as a mechanism to permit the volume to be readily adjusted. In this regard, a user may place the cursor in alignment with a respective icon and may then provide an input, such as rotation of a scroll wheel carried by a computer mouse, in order to controllably adjust the volume of the audio file being played.

As such, a user may efficiently navigate through the transcripted text file and may review the corresponding portions of the audio file without having to guess as to the relevant portions of the audio file. Accordingly, in an embodiment in which a radiologist is utilizing the transcription method, apparatus and computer program product of an example embodiment of the present invention to review the accuracy of a transcripted text file, the radiologist may review the transcripted text file in conjunction with the audio file and may quickly and efficiently replay any selected portions of the audio file, such as those portions of the audio file that capture the key findings of the radiologist. As such, the transcription method, apparatus and computer program product may improve the overall efficiency of the report dictation, transcription and verification process.

As described above, FIG. 1 illustrates a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices 24 of a computing device and executed by processing circuitry 22. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks or steps of the flowchart support combinations of means for performing the specified functions and combinations of steps for performing the specified functions. It will also be understood that one or more blocks of the flowchart, and combinations of blocks in the flowchart, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, suitably configured processing circuitry 22 may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
receiving an audio file and a transcribed text report that includes a plurality of ordered words corresponding to the audio file;
for each of a plurality of positions within the transcribed text report, correlating, with processing circuitry, the respective position within the transcribed text report with a corresponding position within the audio file; and
augmenting the transcribed text report to include a plurality of selectable elements by inserting the plurality of selectable elements within the transcribed text report with each selectable element associated with and displayed at a respective position within the transcribed text report, wherein one or more selectable elements are inserted within the transcribed text report so as to be displayed at a position between the ordered words of the transcribed text report, wherein the selectable elements are responsive to user actuation during review of the transcribed text report in order to cause the audio file to move to the corresponding position and to cause the audio file to be played beginning at the corresponding position with the word following the respective position at which the selectable element is displayed within the transcribed text report,
wherein, following user actuation of a selectable element and playing of the audio file beginning at the corresponding position, the plurality of selectable elements, including one or more selectable elements that were not subject to user actuation, are changed and each of the plurality of selectable elements that are changed, including the one or more selectable elements that were not subject to user actuation, is then responsive to user actuation in order to cause playing of the audio file to be paused.

2. A method according to claim 1 wherein the plurality of selectable elements comprise a plurality of icons, wherein augmenting the transcribed text report to include a plurality of selectable elements comprises inserting an icon within the transcribed text report at each of the plurality of positions of the transcribed text report, and wherein the icons are responsive to user actuation in order to cause the audio file to move to the corresponding position.

3. A method according to claim 2 wherein, following user actuation of an icon and playing of the audio file beginning at the corresponding position, the icon is also configured to permit a volume at which the audio file is played to be adjusted in response to user input provided while a cursor is aligned with the respective icon.

4. A method according to claim 1 further comprising causing display of at least a portion of the transcribed text report including a plurality of contiguous sentences of the transcribed text report, and wherein at least some of the plurality of positions within the transcribed text report are associated with at least one of a punctuation mark located mid-sentence within an intermediate portion of a sentence.

5. A method according to claim 1 wherein correlating the respective position within the transcribed text report with a corresponding position within the audio file comprises:
utilizing speech recognition to analyze the audio file so as to identify words; and
comparing the words that are identified from the audio file with words of the transcribed text report to identify a correspondence therebetween.

6. A method according to claim 5 wherein comparing the words that are identified from the audio file with words of the transcribed text report comprises comparing a collection of words that are identified from the audio file with a sentence from the transcribed text report to identify a correspondence therebetween.

7. A transcription apparatus comprising processing circuitry configured to:
receive an audio file and a transcribed text report that includes a plurality of ordered words corresponding to the audio file;
for each of a plurality of positions within the transcribed text report, correlate the respective position within the transcribed text report with a corresponding position within the audio file; and
augment the transcribed text report to include a plurality of selectable elements by inserting the plurality of selectable elements within the transcribed text report with each selectable element associated with and displayed at a respective position within the transcribed text report, wherein one or more selectable elements are inserted within the transcribed text report so as to be displayed at a position between the ordered words of the transcribed text report, wherein the selectable elements are responsive to user actuation during review of the transcribed text report in order to cause the audio file to move to the corresponding position and to cause the audio file to be played beginning at the corresponding position with the word following the respective position at which the selectable element is displayed within the transcribed text report,
wherein, following user actuation of a selectable element and playing of the audio file beginning at the corresponding position, the plurality of selectable elements, including one or more selectable elements that were not subject to user actuation, are changed and each of the plurality of selectable elements that are changed, including the one or more selectable elements that were not subject to user actuation, is then responsive to user actuation in order to cause playing of the audio file to be paused.

8. A transcription apparatus according to claim 7 wherein the plurality of selectable elements comprise a plurality of icons, wherein the processing circuitry is configured to augment the transcribed text report to include a plurality of selectable elements by inserting an icon within the transcripted text report at each of the plurality of positions of the transcripted text report, and wherein the icons are responsive to user actuation in order to cause the audio file to move to the corresponding position.

9. A transcription apparatus according to claim 8 wherein, following user actuation of an icon and playing of the audio file beginning at the corresponding position, the icon is also configured to permit a volume at which the audio file is played to be adjusted in response to user input provided while a cursor is aligned with the respective icon.

10. A transcription apparatus according to claim 7 wherein the processing circuitry is further configured to cause display of at least a portion of the transcripted text report including a plurality of contiguous sentences of the transcripted text report, and wherein at least some of the plurality of positions within the transcripted text report are associated with at least one of a punctuation mark located mid-sentence within an intermediate portion of a sentence.

11. A transcription apparatus according to claim 7 wherein the processing circuitry is configured to correlate the respective position within the transcripted text report with a corresponding position within the audio file by:
utilizing speech recognition to analyze the audio file so as to identify words; and
comparing the words that are identified from the audio file with words of the transcripted text report to identify a correspondence therebetween.

12. A transcription apparatus according to claim 11 wherein the processing circuitry is configured to compare the words that are identified from the audio file with words of the transcripted text report by comparing a collection of words that are identified from the audio file with a sentence from the transcripted text report to identify a correspondence therebetween.

13. A computer program product comprising at least one non-transitory computer-readable storage medium having computer-executable program code instructions stored therein, the computer-executable program code instructions comprising:
program code instructions configured to receive an audio file and a transcripted text report that includes a plurality of ordered words corresponding to the audio file;
for each of a plurality of positions within the transcripted text report, program code instructions configured to correlate the respective position within the transcripted text report with a corresponding position within the audio file; and
program code instructions configured to augment the transcripted text report to include a plurality of selectable elements by inserting the plurality of selectable elements within the transcripted text report with each selectable element associated with and displayed at a respective position within the transcripted text report, wherein one or more selectable elements are inserted within the transcripted text report so as to be displayed at a position between the ordered words of the transcripted text report, wherein the selectable elements are responsive to user actuation during review of the transcripted text report in order to cause the audio file to move to the corresponding position and to cause the audio file to be played beginning at the corresponding position with the word following the respective position at which the selectable element is displayed within the transcripted text report,
wherein, following user actuation of a selectable element and playing of the audio file beginning at the corresponding position, the plurality of selectable elements, including one or more selectable elements that were not subject to user actuation, are changed and each of the plurality of selectable elements that are changed, including the one or more selectable elements that were not subject to user actuation, is then responsive to user actuation in order to cause playing of the audio file to be paused.

14. A computer program product according to claim 13 wherein the plurality of selectable elements comprise a plurality of icons, wherein the program code instructions configured to augment the transcripted text report to include a plurality of selectable elements comprise program code instructions configured to insert an icon within the transcripted text report at each of the plurality of positions of the transcripted text report, and wherein the icons are responsive to user actuation in order to cause the audio file to move to the corresponding position.

15. A computer program product according to claim 14 wherein, following user actuation of an icon and playing of the audio file beginning at the corresponding position, the icon is also configured to permit a volume at which the audio file is played to be adjusted in response to user input provided while a cursor is aligned with the respective icon.

16. A computer program product according to claim 13 wherein the computer-executable program code instructions further comprise program code instructions configured to cause display of at least a portion of the transcripted text report including a plurality of contiguous sentences of the transcripted text report, and wherein at least some of the plurality of positions within the transcripted text report are associated with at least one of a punctuation mark located mid-sentence within an intermediate portion of a sentence.

17. A computer program product according to claim 13 wherein the program code instructions configured to correlate the respective position within the transcripted text report with a corresponding position within the audio file comprise:
program code instructions configured to utilize speech recognition to analyze the audio file so as to identify words; and
program code instructions configured to compare the words that are identified from the audio file with words of the transcripted text report to identify a correspondence therebetween.

18. A computer program product according to claim 17 wherein the program code instructions configured to comparing the words that are identified from the audio file with words of the transcripted text report comprise program code instructions configured to compare a collection of words that are identified from the audio file with a sentence from the transcripted text report to identify a correspondence therebetween.

* * * * *